United States Patent Office 3,090,241
Patented May 21, 1963

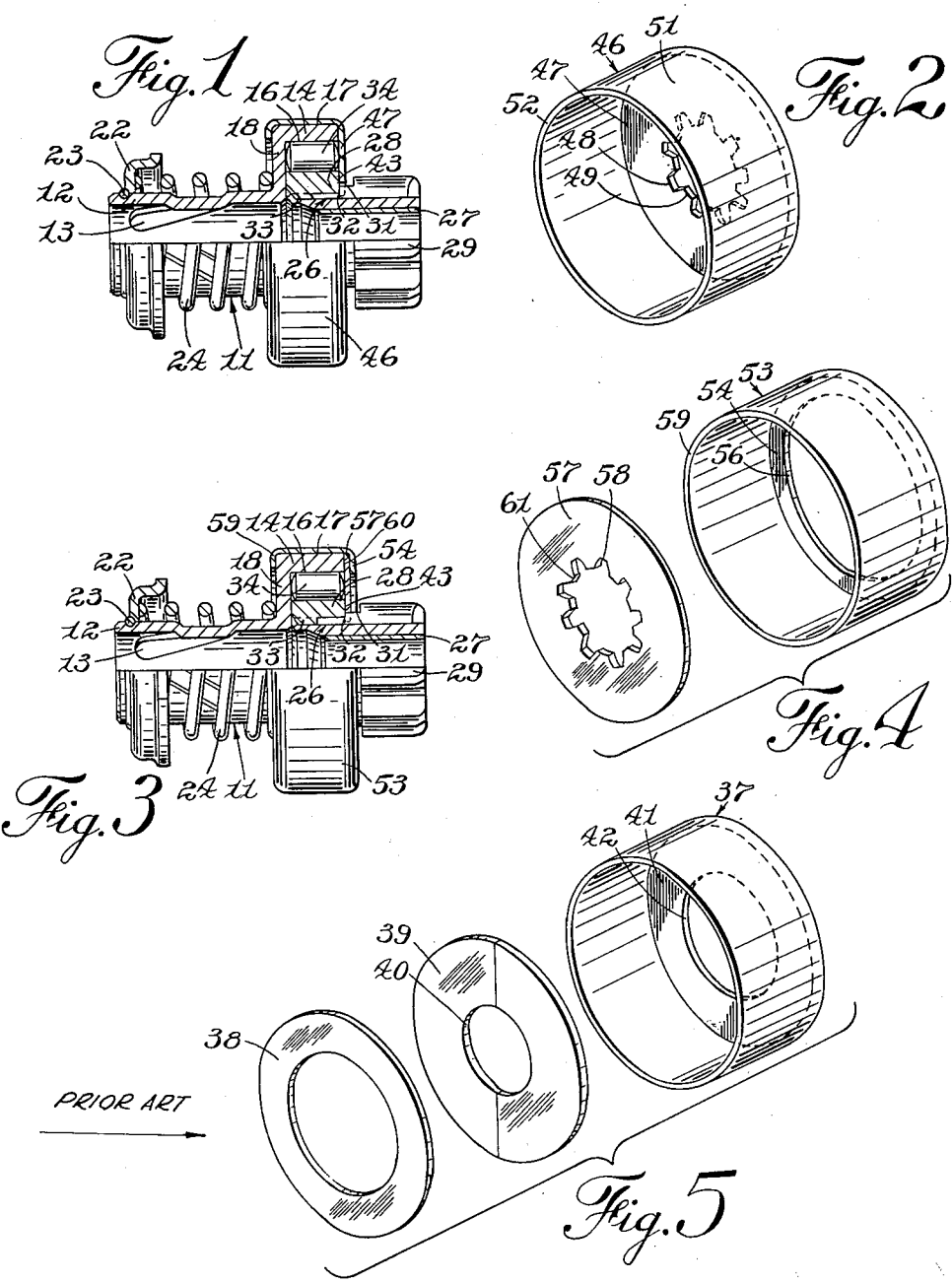

3,090,241
INTERNAL COMBUSTION ENGINE STARTER
DRIVE
Nelson H. Mageoch and Harold J. Little, Elmira, N.Y.,
assignors to The Bendix Corporation, Elmira, N.Y., a
corporation of Delaware
Filed Dec. 16, 1960, Ser. No. 76,203
8 Claims. (Cl. 74—7)

This invention relates to an internal combustion engine starter drive of the positive shift type and more particularly relates to a drive of that type which includes a roller overrunning clutch.

Starter drives utilizing the inside-out overrunning clutch, i.e. clutches wherein the camming action by roller means is exerted radially inwardly due to a cam surface on an inner surface of an outer driving clutch member and is effective against an inner driven clutch member's outer surface, have been in general use for at least the better part of the last quarter of a century as is taught by U.S. Patent 2,211,053 granted to Critchfield. Over the years there have been repeated efforts to improve on this type of overrunning clutch. These efforts have been directed towards increasing the strength of the structure while reducing the costs associated with its manufacture and fabrication. The copending applications of Whitney et al. Serial No. 69,672, filed November 16, 1960, and Puro et al. Serial No. 74,938, filed December 9, 1960, assigned to the assignees hereof, disclose and claim inventions directed toward reducing the manufacturing and fabricating costs by providing improved clutch roller biasing mechanisms. Further costs in the manufacture of this type of starter drive can be accomplished through the use of an improved clutch casing which forms the subject invention hereinafter described and claimed.

Prior art overrunning clutches of this type consists of an outer driving clutch element and an inner driven clutch element coaxially and concentrically disposed with unidirectional driving means interposed therebetween. The clutch members are maintained in their aligned and assembled relationship by means of a plurality of washers, both standard and halved, and by a large apertured flanged casing. The solid standard washer is provided with a large aperture of sufficient size to slip over the pinion free from contact therewith. After the clutch members are positioned in their aligned relationship a pair of half washers are inserted between the solid washer and the pinion gear teeth extremities. The centered aperture formed by the half washers is of a smaller diameter than the pinion diameter and the combined effect of both of the washers is to properly retain the clutch members in their axially disposed relationship. A casing envelops portions of the clutch members to retain the clutch members and washers in their proper positions. The casing has a rim crimped over a radial flange of the body assembly which includes the driving clutch member and has a large apertured flange formed integral therewith which compressively engages the positioned washers. The flange urges the standard washers into engagement with shoulder means provided by the clutch members with the half washers interposed between standard washer and the casing flange. In order to properly and speedily assemble the casing it is necessary that the casing flange be provided with an aperture which has a larger diameter than the pinion diameter. It should be apparent that the use of the described assembly principles and structures necessitates extra and expensive assembly jigs, is cumbersome, time consuming and requires extra and costly material and piece parts. Also, detrimental friction exists between these piece parts and a lubrication problem is existent.

It is, therefore, the primary object of the present invention to provide a starter drive with an overrunning roller type clutch using a clutch casing means which will eliminate the need for costly prior art washer members without eliminating the functions served by those piece parts.

It is another object of the present invention to provide a starter drive and an associated overrunning roller type clutch which can be economically manufactured and fabricated, which is durable and which is efficient and reliable in operation.

It is a further object of the present invention to provide a novel casing for a starter drive overrunning clutch member.

It is still another object of the present invention to provide a starter drive incorporating an overrunning clutch in which the means for axially aligning the clutch elements is apertured to conform to the external configuration of the pinion and is adapted to be slid over the pinion to facilitate assembly of the drive.

It is a still further object of the present invention to provide a novel casing for a starter drive overrunning clutch which has a radially inwardly formed flanged member having a shaped aperture conforming to the external configuration of the pinion adapted to be slid over the pinion into abutting engagement with clutch element shoulder means to maintain the elements in their proper aligned and assembled positions.

The foregoing and other objects and advantages of the invention will appear more fully in consideration of the detailed description which follows wherein two embodiments of the invention are illustrated. It is to be expressly understood, however, that the drawing is for the purpose of illustration and description and is not to be construed as defining the limits of the invention.

In the drawing:

FIGURE 1 is a longitudinal view, partly in section, illustrating a starter drive of the positive shift type having an overrunning roller clutch in which a first embodiment of the invention is utilized;

FIGURE 2 is a detailed perspective view of the first embodiment of the invention, and more specifically is an illustration of a novel casing-clutch element retaining member;

FIGURE 3 is a view similar to FIGURE 1, illustrating a starter drive incorporating a second embodiment of the invention;

FIGURE 4 is a detailed perspective view of the second embodiment of the invention, and more specifically is an illustration of a novel casing and a separate clutch element retaining means; and FIGURE 5 is an exploded detailed perspective view of the prior art form of an overrunning clutch casing and clutch element retaining means.

In FIGURE 1 there is illustrated a starter drive for an internal combustion engine which is secured to a power shaft of a starting motor (not shown). A sleeve 12 forming a portion of the body assembly generally designated as 11 is supported on the power shaft and has helical threads 13 formed on its internal surface which engage complementing helical splines in the power shaft. Formed on the right extremity of the sleeve (FIGURES 1 and 3) is a driving or outer clutch element 14. The driving clutch element can be formed as an integral part of the sleeve, as by cold forming, or can be separately formed and be joined to the sleeve by brazing or any other convenient method. The driving or outer clutch member has inner and outer peripheral surfaces 16 and 17, respectively, and is connected to the sleeve by a radial flange 18. Formed in the outer clutch member and opening to the inner peripheral surface 16 are a plurality of circumferentially spaced recesses. Adjacent one extremity of each recess there is formed an integral cam surface which is eccentrically located relative to the axis of the clutch.

A shifting flange 22 locked against axial displacement to the left by snap ring retainer 23 is supported adjacent the left extremity of the sleeve with a mesh enforcing spring 24 concentrically disposed about the sleeve asserting a bias upon the shifting flange 22 and the flange 18 of the driving clutch member. A fork member (not shown nor forming a part of the invention) when actuated by the starting motor abuts the shift flange and shifts the starter drive into mesh with a gear of the engine to be started.

The pinion assembly 26 in coaxial alignment with the power shaft is slidably journalled by bearing means 27 on a reduced diameter of the power shaft and supports the driven or inner clutch element 28. The driven clutch element is, when assembled, concentrically disposed within the driving clutch member 14. The pinion assembly comprises a pinion gear 29 journalled by means of the bearing 27 on the power shaft. The rear extremity of the pinion is reduced in diameter to provide a radial shoulder 32 and an elongated support for the annulus or collar member 28 which forms the driven member per se. The collar member 28 abuts the shoulder 32 and is axially secured to the pinion by any convenient method such as staking or brazing. The collar is also secured against rotation relative to the pinion by complementing splines 33 formed on the reduced diameter portion of the pinion and on the internal diameter of the collar. The outer peripheral surface of the collar provides a smooth cylindrical driven clutch surface when the body assembly 11, rollers 34 and the pinion assembly 26 are fabricated.

A plurality of rollers 34 of a predetermined diameter provide unidirectional driving engagement between the driving and driven clutch members 14 and 28, respectively. A roller is, of course, disposed in each recess. Also disposed in each recess is a roller biasing mechanism. To this point the device's structure is well known. The roller biasing mechanisms used therewith can best be understood by referring to the description and claims of the previously mentioned Whitney and/or Puro applications.

In the prior art the method of assembling the driving and driven clutch members and the driving means therebetween in their assembled and aligned relationship utilized a casing 37 and a plurality of washer means. The components used in the prior art are illustrated in FIGURE 5. The common practice when utilizing these prior art components was to provide radially aligned shoulder means on the clutch members. A standard large apertured washer 38 was positioned against clutch member shoulder means. The washer 38 when the clutch elements were aligned engaged radial shoulders provided by the clutch members. A pair of split washers 39 defining an aperture 40 having an opening smaller in diameter than the pinion dimension were positioned between the pinion gear teeth extremities and the standard washer 38. The half washers 39 were journalled on a shoulder provided on the extremity of the pinion adjacent the gear teeth extremities. In order to maintain the washers in their assembled position and, of course, to maintain the clutch elements in their aligned position required a casing member 37 supported by the outer clutch member. Inturned radial flanges of the casing encompass the external or peripheral portions of the driving clutch member. One of the casing flange members 41 had an apertured opening 42 which had a radial dimension considerably larger than the pinion outer dimensions. The aperture 42 enabled the casing 37 with the large preformed flange 41 to be slid over the pinion without contact therewith into abutting engagement with the split washers 39. The opposite extremity of the casing was then rolled or inturned to compressively engage the outer driving clutch member flange whereby the large casing flange 41 compressively retained the washer members 38 and 39 in their proper assembled positions.

In the present invention it is proposed that an edge portion of the driven clutch member 28 be formed as a radial shoulder 43 which is axially spaced in a demeshing direction from the rear extremities of the pinion gear teeth. The radial shoulder 43 has a radial height greater than the pitch diameter of the pinion. The axial depression 31 is formed intermediate the radial shoulder and the pinion gear teeth extremities and has a diametrical dimension substantially equal to but not greater than the pinion pitch diameter.

The casing member 46 illustrated in FIGURES 1 and 2 comprises a substantially cup-shaped member. The bottom wall or flange 47 is formed with an aperture 48 having a serrated profile with inwardly projecting peak portions 49. The serrated profile substantially conforms to the external configuration of the pinion 29 and is adapted to be slid over the pinion into abutting engagement with the driving clutch member 28 and the radial shoulder 43. An integral cylindrical side wall 51 of the casing 46 is adapted to be supported on the peripheral portion 17 of the outer clutch member 14. The edge or rim 52 of the side portion of the casing is crimped radially inwardly to compressively engage the driving clutch member flange 18. When assembled the casing flange 47 will compressively engage the clutch elements maintaining the elements as well as the roller biasing mechanism in an aligned and assembled position without the need for ancillary washer means. When the casing 46 is assembled on the outer clutch member 14, the projecting peak portions 49 of the serration will compressively engage the radial shoulder 43 and the extremities thereof will be spaced radially from the axial depression 31. When assembled the body assembly 11 including the casing member 46 can be rotated relative to the pinion assembly without detrimental frictional engagement with the pinion assembly, and with minimal lubrication requirements.

In FIGURES 3 and 4 there is illustrated a second embodiment of the invention. All of the components of the body assembly 11 and the pinion assembly 26 are identical to those previously described and have been so identified by identical reference characters. In the second embodiment the casing 53 comprises a substantially cup-shaped member having an inturned flange or base 54 which has a large circular aperture 56. A washer means 57 has a central aperture 58 which is serrated in profile so as to substantially conform to the external configuration of the pinion 29. The washer 57 is adapted to be slid over the pinion 29 to abut the radial shoulder 43 of the driven clutch member 28 and the edge shoulder portion 60 of the driving clutch member 14 as well as portions of the driving connection or biasing mechanisms therebetween. The cup-shaped casing 53 is then slipped over the pinion with its flanged member 54 compressively engaging the marginal portion of the serrated washer 57. The edge portion 59 of the casing side wall is radially inturned to compressively engage the driving clutch member flange 18. The casing 53 thus is supported on the peripheral portion 17 of the outer clutch member 14 and by its flange 54 maintains the concentric alignment and assembled relationship of the clutch members. As in the previous embodiment the peak inward projections 61 of the serrations of the washer 57 will engage portions of the radial shoulder 43 of the driven clutch member and the extremities of the peak portions will be radially spaced above and out of contact with the axial depression 31 of the pinion. When the clutch is assembled the body assembly 11 will be free to rotate relative to the pinion assembly 26 without detrimental frictional engagement existing between the assemblies and with minimal lubrication requirements.

In operation the fork member is caused to engage the shifting flange 22 to urge the starter drive assembly to the right in FIGURES 1 and 3. This axial movement causes the pinion 29 to mesh with a gear of the engine to be started. Should tooth abutment occur between the pinion gear and the engine gear the fork will continue to urge the shifting flange 22 in a meshing direction, thus compressing the mesh enforcing spring 24. When the fork is moved a predetermined distance in the meshing direction the starting motor will be energized causing the initiation of power shaft rotation. This initial rotation of the shaft will cause the clutch to become operative and the pinion will be rotated. Pinion rotation will result in pinion gear and engine gear alignment thereby allowing the completion of the meshing action to occur. The moment the teeth become properly aligned the mesh enforcing spring will be somewhat released from its compressed condition and the spring release energy will be available to insure proper and quick mesh. The helical thread coupling between the power shaft and the sleeve will also materially assist the meshing action after tooth alignment by translating some of the initial rotation into axial movement insuring a sufficient degree of pinion-gear engine-gear engagement eliminating the hazard of pinion milling action on the edges of the ring gear of the engine.

When the starter drive assumes the driving condition the body assembly 11 will rotate. Momentarily the pinion assembly 26 because it is in mesh with the engine gear will be motionless relative to the body assembly and resultingly the combined effect of the rotation of the body assembly 11, the meshed position of the pinion 29 and the bias asserted by the roller biasing mechanism will be sufficient to cause the rollers 34 to assume the wedged position between the cam surface of the outer clutch member 14 and the clutch surface of the driven clutch member 28. Thereafter the clutch will function in the desired manner.

Should the engine misfire or when a true start has been accomplished the pinion assembly 26 will then be driven by the engine gear. The pinion speed when increased by the gear combination of ring gear and pinion is well in excess of the starting motor speeds and thus cause the overrunning clutch to function as desired to prevent the starting motor from being driven by the engine. The pinion will maintain mesh until the fork returns the starter drive to the demeshed position.

It will be readily apparent to those skilled in this art that the starter drive which incorporates a serrated shaped apertured flanged member or the apertured washer, and the novel casing associated therewith is an improvement over the prior art. Further, the invention herein disclosed eliminates the need for extra and expensive assembly jigs, is not cumbersome nor time consuming to assemble and eliminates the unnecessary washer members heretofore used.

Structural variations of the subject invention within the scope of the teachings above set forth may be possible and it is contemplated that such variations shall come within the spirit and scope of the appended claims.

We claim:

1. A starter drive for internal combustion engines comprising: a sleeve adapted to be drivingly connected to a power shaft of a starting motor; a pinion adapted to be slidably journalled on the shaft for movement into and out of mesh with a gear of the engine to be started; an overrunning clutch including a driving clutch member connected to the sleeve and a driven clutch member connected to the pinion, said clutch members being concentrically positioned relative to one another; means providing a unidirectional driving connection between the concentrically positioned clutch members; unitary annular means having a central aperture shaped to conform to the external toothed configuration of the pinion adapted to be slid into position over the pinion to engage portions of the clutch members and the clutch driving connection means for axially aligning the clutch members; a casing formed to envelop portions of the overrunning clutch for maintaining the axially aligned clutch members and clutch driving connection means in an assembled relationship; and, means supported on the sleeve for axially shifting the drive into and out of mesh.

2. A starter drive as set forth in claim 1 which further comprises: radial shoulder means formed on the innermost concentrically positioned clutch member axially spaced rearwardly of the pinion teeth, said radial shoulder means having a radial height at least equal to the greatest external radial dimension of the pinion; an axial depression intermediate the radial shoulder means and the pinion teeth, said axial depression having a diametrical dimension not greater than the pinion pitch diameter; and, in which the conformed central aperture of the clutch member aligning means is serrated with the projecting peak portions of the serrations engaging the radial shoulder means and radially spaced from the axial depression.

3. The starter drive as set forth in claim 2 in which the casing comprises a cup-shaped member having a base and a side wall, the side wall adapted to be supported on the outermost concentrically positioned clutch member with its rim inturned to compressively abut a marginal portion to the clutch member, the base of said casing providing the centrally apertured clutch member aligning means adapted to engage and maintain the axial alignment of the clutch members when the casing side wall is inturned.

4. A starter drive as set forth in claim 2 in which the clutch member aligning means comprises an annular washer, and in which the casing is supported on the outermost concentrically positioned clutch member and includes inturned edge portions, one of said edge portions compressively engaging portions of the supporting clutch member, the other of said edge portions compressively engaging marginal portion of the annular washer urging said washer into engagement with the clutch members and the driving connection means therebetween.

5. A starter drive for internal combustion engines comprising, in combination: a sleeve adapted to be drivingly connected to a power shaft of a starter motor; a pinion adapted to be slidably journalled on the shaft for movement into and out of mesh with a gear of the engine to be started; an overrunning clutch including an outer driving clutch member connected by a radial flange to the sleeve and an inner driven clutch member connected to the pinion concentrically mounted relative to the outer clutch member; means providing a unidirectional driving connection between the concentrically positioned clutch members; unitary annular means having a central aperture shaped to conform to the external toothed configuration of the pinion adapted to be slid into position over the pinion to abut portions of the clutch members and the means providing the clutch driving connection for axially aligning the clutch members; a casing supported on the outer clutch member and formed to envelop portions of the overrunning clutch for maintaining the axially aligned clutch members and clutch driving connection means in an assembled relationship; and, means supported on the sleeve for axially shifting the drive into and out of mesh.

6. A starter drive as set forth in claim 5 which further comprises: radial shoulder means formed on the concentrically positioned driven clutch member axially spaced in a demeshing direction from the pinion teeth, said radial shoulder means having a radial height greater than the pitch diameter of the pinion; an axial depression intermediate the radial shoulder means and the pinion teeth, said axial dimension having a diametrical dimension not greater than the pinion pitch diameter; and, in which the conformed central aperture of the clutch member aligning means has a substantially serrated profile with inwardly projecting peak portions adapted to be readily spaced from the axial depression and to engage portions of the radial shoulder means.

7. A starter drive as set forth in claim 6 in which the casing comprises a cup-shaped member having a cylindrical side wall and a base, the base of said casing providing the centrally apertured clutch member aligning means, the side wall adapted to be supported on the outer concentrically positioned clutch member with its rim inturned to compressively abut the marginal portion of the radial flange to properly position the casing base.

8. A starter drive as set forth in claim 5 in which the clutch aligning means comprises an annular washer member, and in which the casing includes inturned edge portions, one of said edge portions compressively engaging edge portions of the radial flange, the other of said edge portions compressively engaging marginal portions of the annular washer urging said washer into engagement with the concentrically positioned clutch members maintaining the clutch driving connection means in proper axial relationship relative to the clutch members.

References Cited in the file of this patent

UNITED STATES PATENTS

| | | |
|---|---|---|
| 1,761,518 | Chryst | June 3, 1930 |
| 2,275,177 | Crans | Mar. 3, 1942 |
| 2,383,727 | Lewis | Aug. 28, 1945 |
| 2,562,196 | Lewis | July 31, 1951 |
| 2,710,606 | Jenny | June 14, 1955 |
| 2,899,829 | Smith | Aug. 18, 1959 |
| 2,939,323 | Kochendorfer | June 7, 1960 |

FOREIGN PATENTS

| | | |
|---|---|---|
| 575,151 | Germany | Apr. 6, 1933 |